(12) United States Patent
Eick et al.

(10) Patent No.: US 9,164,187 B2
(45) Date of Patent: Oct. 20, 2015

(54) ELECTRICAL ENERGY ACCUMULATOR

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 386 days.

(21) Appl. No.: 13/873,952

(22) Filed: Apr. 30, 2013

(65) Prior Publication Data

US 2013/0286788 A1 Oct. 31, 2013

Related U.S. Application Data

(60) Provisional application No. 61/640,245, filed on Apr. 30, 2012.

(51) Int. Cl.
| | |
|---|---|
| *G01V 1/155* | (2006.01) |
| *G01V 1/09* | (2006.01) |
| *G01V 1/147* | (2006.01) |
| *G01V 1/145* | (2006.01) |

(52) U.S. Cl.
CPC ...... *G01V 1/155* (2013.01); *G01V 1/09* (2013.01); *G01V 1/147* (2013.01); *G01V 1/145* (2013.01)

(58) Field of Classification Search
CPC ....... G01V 1/09; G01V 1/143; G01V 1/1047; G01V 1/147; G01V 1/145; G01V 1/155
USPC .......................................... 181/111, 114, 121
See application file for complete search history.

(56) References Cited

U.S. PATENT DOCUMENTS

| | | | | |
|---|---|---|---|---|
| 2,675,882 A | * | 4/1954 | Bazzoni et al. | 181/111 |
| 3,483,514 A | | 12/1969 | Barbier et al. | |
| 3,777,843 A | * | 12/1973 | Fair et al. | 181/114 |
| 4,114,722 A | * | 9/1978 | Weber et al. | 181/114 |
| 4,133,409 A | * | 1/1979 | Mifsud et al. | 181/114 |
| 4,372,420 A | * | 2/1983 | White | 181/120 |
| 4,458,777 A | * | 7/1984 | Weber et al. | 181/121 |
| 4,651,044 A | * | 3/1987 | Kompanek | 310/323.17 |
| 4,692,672 A | | 9/1987 | Okuno | |
| 4,734,894 A | | 3/1988 | Cannelli et al. | |
| 4,850,449 A | | 7/1989 | Cheung | |
| 4,853,906 A | * | 8/1989 | Cole | 367/189 |
| 5,614,670 A | * | 3/1997 | Nazarian et al. | 73/146 |
| 5,969,297 A | | 10/1999 | Ambs | |

(Continued)

*Primary Examiner* — Ari M Diacou
(74) *Attorney, Agent, or Firm* — ConocoPhillips Company

(57) ABSTRACT

The invention is an electric power accumulator used with an electric sweep type seismic vibrator source of the type used in seismic prospecting for hydrocarbons. The source uses an engine and generator combination to create electric power to drive a frame of linear electric motors that direct a rod or piston to contact the ground in a recurring fashion. The source may also be designed to use electric power to drive the source from location to location through a survey area. A large electric power accumulator is provided to store electric power when the generator is able to produce excess power and the accumulator may deliver power along with the generator to drive the rods and deliver acoustic energy. With a large electric power accumulator, such as a battery or capacitor, the engine and generator combination may be engineered to be somewhat smaller, less costly and more efficient than a system where the engine and generator were sized to provide the electric power at times of maximum electric draw.

11 Claims, 2 Drawing Sheets

(56) References Cited

U.S. PATENT DOCUMENTS

| | | | |
|---|---|---|---|
| 6,179,084 B1 | 1/2001 | Yamamoto et al. | |
| 7,657,350 B2 * | 2/2010 | Moran | 701/22 |
| 7,841,444 B2 * | 11/2010 | Cannell et al. | 181/121 |
| 8,256,565 B2 * | 9/2012 | Pabon et al. | 181/104 |
| 2003/0168277 A1 * | 9/2003 | Hopperstad et al. | 181/111 |
| 2010/0232260 A1 * | 9/2010 | Zowarka et al. | 367/189 |
| 2011/0209940 A1 * | 9/2011 | Daraio | 181/139 |
| 2012/0037444 A1 * | 2/2012 | Eick et al. | 181/114 |
| 2013/0155817 A1 * | 6/2013 | Kim | 367/189 |

\* cited by examiner

ELECTRICAL ENERGY ACCUMULATOR

CROSS-REFERENCE TO RELATED APPLICATIONS

This application is a non-provisional application which claims benefit under 35 USC §119(e) to U.S. Provisional Application Ser. No. 61/640,245 filed Apr. 30, 2012, entitled "ELECTRICAL ENERGY ACCUMULATOR," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to limitations of hydraulic fluid flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies it is difficult for the hydraulic vibe to have enough travel and enough fluid flow to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a vibratory seismic source for delivering acoustic energy into the ground for seismic prospecting including a generator for creating electric power and an electric power accumulator for storing electric power created by the generator. The source further includes a plurality of linear motors arranged in a grid and each including a rod that is arranged to move generally vertically to contact the ground at a lower end of the rod and a control system for directing electricity from the generator and concurrently from the electric power accumulator to electrically power movement of the rods such that the rods vibrate the ground and deliver acoustic energy into the ground.

The invention also relates to a process for delivering acoustic energy into the earth for seismic prospecting wherein electric power is created with a generator on a mobile seismic source and excess electric power generated by the generator is periodically stored with an electric power accumulator on the mobile seismic source. A plurality of linear electric motors are provided on the source wherein each linear motor comprises a tubular body and a rod for telescopically extending down from the tubular body into contact with the ground. The rods are lowered to the ground and electric power is utilized from both the generator and the battery directly from each to power the linear electric motors and drive the rods down against the ground in a series of impulses so that the ground is vibrated and deliver acoustic energy into the earth.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
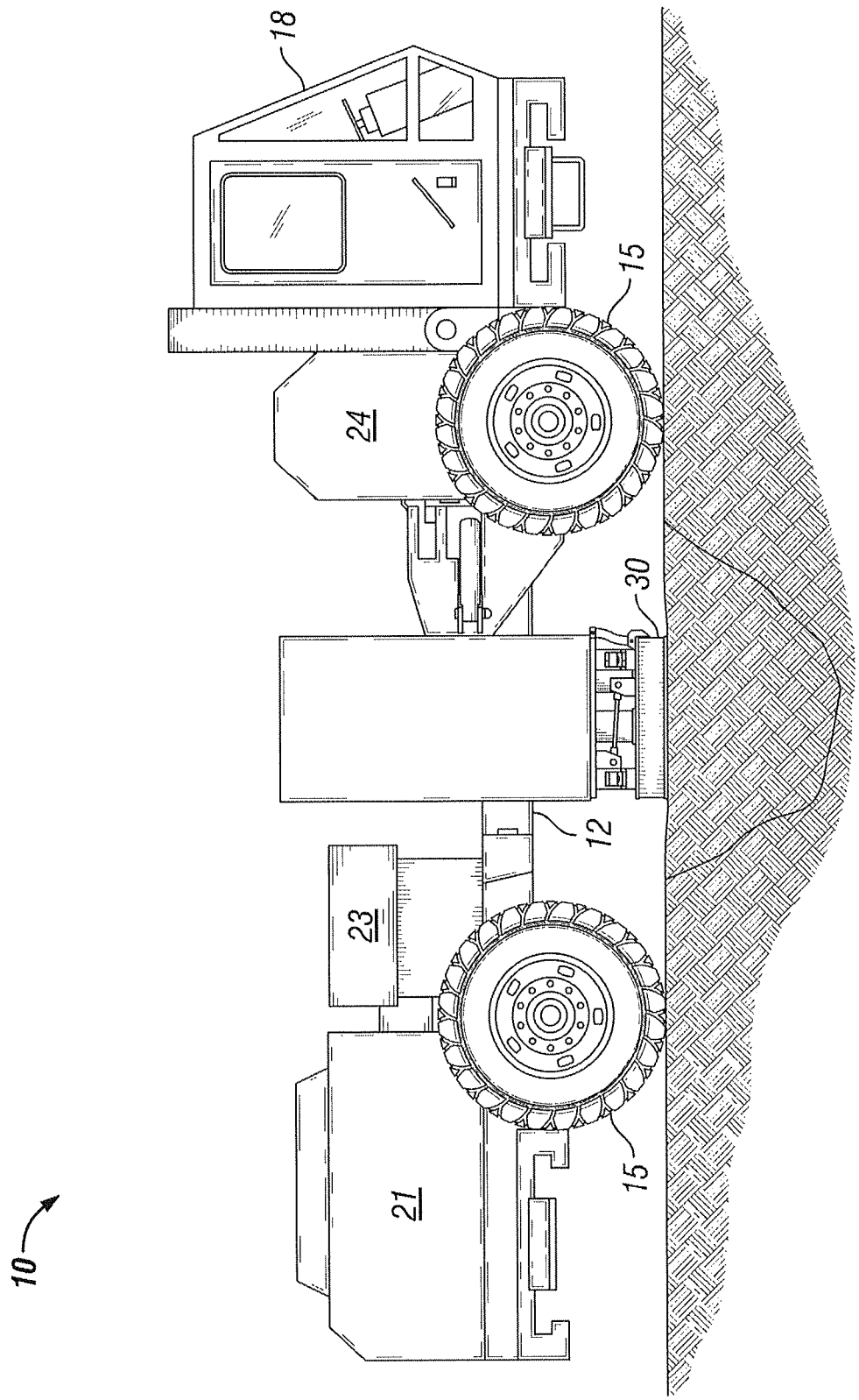
FIG. 1 is an elevation view of a discrete electric seismic source unit.

As shown in FIG. 1, an alternative vibrator seismic source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large electric power accumulator 24 such as a battery, capacitor or both are included to store energy for high electric demand situations or when there are problems with the generator 23, but the accumulator 24 provides the power to return to a location for repair. By including a large electric power accumulator, the diesel engine 21 and electric generator 23 may be sized and engineered to deliver some electric power output lower than peak demand utilizing the accumulator to meet the highest needs. As such, the seismic source 10 may be smaller and obtained at lower cost and may have a lower operating cost to provide equivalent acoustic energy output.

Figure 2:
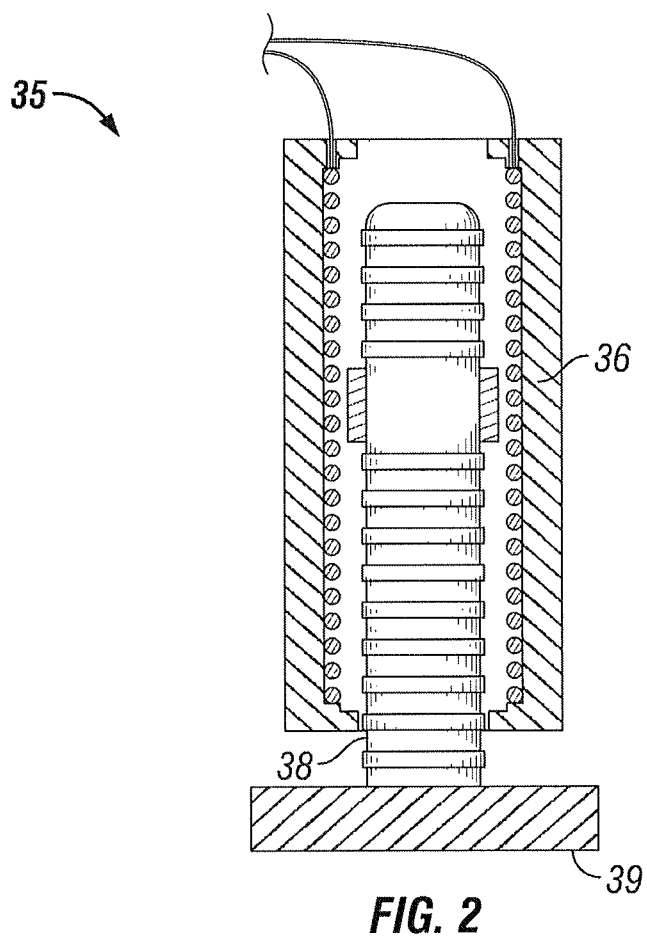
FIG. 2 is an enlarged fragmentary view of an electromechanical linear motor assembly for delivering seismic energy into the ground.
Figure 3:
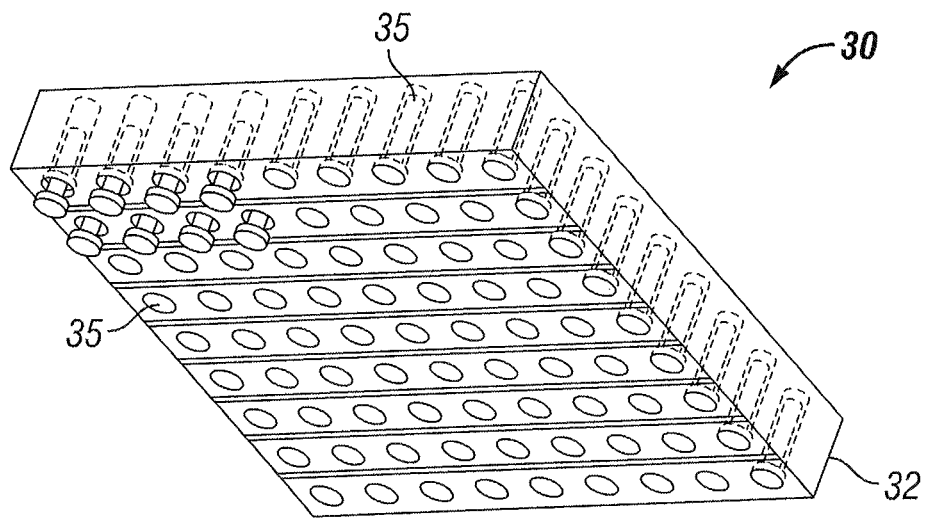
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. While commercially available liner motors vary in design from manufacturer to manufacturer, in principal each linear motor 35 includes some form of a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In the preferred embodiment approximately 2000 linear motors 35 are arranged in a grid of perhaps 40 by 50.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a sweep of acoustic energy is effectively delivered into the earth while the feet remain in contact with the ground G. It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 23 and supplemented by the electric power accumulator 24 as required during force output. The impulses would be repeated in a sequence where the impulse would occur with progressively increasing or decreasing rapidity such that a progression of frequencies of impulse forces would effectively deliver acoustic energy into the earth. As an example, the acoustic energy being characterizeable as a progressive sweep of frequencies covering a spectrum from about 1 Hz up to at least 80 Hz and preferably up to 120 Hz.

The electric linear motors 35, working in conjunction, would not suffer the limitations of the hydraulic pumping systems at high frequency. Applying and reversing electric power instantly to the linear motors 35 causes movement of the rods 38 within the tubular bodies 36, and the impulse frequency range is greatly expanded. By using electrical control circuits that are commonly available for diesel electric train locomotives and hybrid cars, the power can be applied instantly with a very high degree of control and stabilization. The force developed by a linear motor is a function of the voltage and amperage applied which can be easily modulated to provide the motion desired from the linear motors 35.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 2000, more than 2000 or less than 2000, will be able to deliver high energy at high frequency. The size of the linear motors may be reduced or increased to adjust and adapt to ideal energy delivery system to create an optimal frequency range with high energy across the spectrum.

The selection of the specific linear motors is an engineering issue at production time because they can be sourced to have a large thrust force but with short strokes as compared to those that have longer strokes with less thrust, but higher speeds. As one embodiment of the invention the electric power accumulator 24 is paired with a commercially available linear motor unit that produces a 32 Newtons of continuous thrust with a 24" stroke using 1.3 amps at 240 volts AC. The same unit when operated at maximum acceleration force of 138 Newtons utilizes 5.2 amps RMS (Arms) at 240 volts AC. At maximum acceleration force this is 1248 watt or the equivalent of 1.67 Hp of input energy. An array of 300 of these linear motors would require a minimum of 374,400 watt or equivalent of approximately 502 Hp of input energy. If the alternative vibrator actuator source 10 uses a diesel engine 21 rated at 450 Hp to turn an electric generator 23, the continuous output of the electric generator 23 would be insufficient to operate this array of linear motors at maximum acceleration force. With the array of linear motors operating at maximum acceleration force a minimum of 52 Hp or approximately 38,776 watt would need to be supplemented by the electric power accumulator 24. If the array of these linear motors is operated at the 32 Newtons continuous thrust, only 93,600 watt or the equivalent of approximately 126 Hp is needed resulting in excess generation that is used to charge the electric power accumulator 24.

Operating the linear motor at maximum acceleration force is equivalent to the down stroke of the linear motor pushing the replaceable foot 39 into the ground G. Operating the linear motor at continuous thrust is equivalent to an up stroke of the linear motor releasing the pressure from the replaceable foot 39 so that less force is exerted on ground G.

As the preferred embodiment of the invention, the electric power accumulator 24, packets of lithium ion batteries, Ni-MH battery packs, or similar battery arrangements to those used in hybrid automobiles would be utilized with charging control circuits, AC conversion circuits and power output limiting control circuits. The configuration would be designed to provide at minimum the required supplemental power for the array of linear motors being utilized at maximum acceleration force over several minutes of duration. The capacity of the battery packs would be sized so that the combination of the output of the electric generator 23 and the output of the electric power accumulator 24 would be able to continuously supply sufficient power to the array of linear motors during its activation duty cycle and then charge in a operational acceptable cycle time to be ready for the next duty cycle. The operational acceptable time for charging between duty cycles would be equivalent to the time required nominally to move between the desired source activation points on the Earth.

In a second embodiment of the invention, the electric power accumulator 24, utilizes a configuration of capacitors to store the electrical power. The electric power accumulator could be utilized with charging control circuits, AC conversion circuits and power output limiting control circuits. The configuration would be designed to provide at minimum the required supplemental power for the array of linear motors being utilized at maximum acceleration force over several minutes of duration. The capacity of the capacitor storage would be sized so that the combination of the output of the electric generator 23 and the output of the electric power accumulator 24 would be able to continuously supply sufficient power to the array of linear motors during its activation duty cycle and then charge in a operational acceptable cycle time to be ready for the next duty cycle. The operational acceptable time for charging between duty cycles would be equivalent to the time required nominally to move between the desired source activation points on the Earth.

As a third embodiment of the invention, the electric power accumulator 24, packets of lithium ion batteries, battery packs, similar to those used in hybrid automobiles would be utilized along with a configuration of capacitors. Also included would be charging control circuits, AC conversion circuits and power output limiting control circuits. The configuration would be designed to provide at minimum the required supplemental power for the array of linear motors being utilized at maximum acceleration force over several minutes of duration. The capacity of the battery packs and configuration of capacitors would be sized so that the combination of the output of the electric generator 23 and the output of the electric power accumulator 24 would be able to continuously supply sufficient power to the array of linear motors during its activation duty cycle and then charge in a operational acceptable cycle time to be ready for the next duty cycle. The operational acceptable time for charging between duty cycles would be equivalent to the time required nominally to move between the desired source activation points on the Earth.

In a further embodiment of the electric power accumulator, the back EMF energy generated by operating the complete discrete source unit would be rerouted to the accumulator to avoid waste energy as heat. Any downhill operation of the unit or anytime spent coasting would force the electric drive motors to operate while not under drive electric power. When this happens, it forces the motors to generate electric current because they are operating in reverse direction to normal current flow and therefore generate electric power just like any normal electric motor. This energy could be captured to the accumulator and stored instead of being dissipated as heat. In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A vibratory seismic source for delivering acoustic energy into the ground for seismic prospecting, the source comprising:
   a) a generator for creating electric power;
   b) an electric power accumulator for storing electric power created by the generator;
   c) about 100 to 5,000 linear motors arranged in a grid and carried by a frame, wherein each linear motor includes a rod that is arranged to move generally vertically to contact the ground at a lower end of the rod; and
   d) a control system for directing electricity from the generator and concurrently from the electric power accumulator to electrically power movement of the rods such that the rods vibrate the ground and deliver acoustic energy into the ground.

2. The vibratory seismic source according to claim 1, wherein the linear motors are carried by a frame, and the source includes an electric powered system to raise and lower the frame to the ground so that the rods may be operated into contact with the ground and raised up and clear of the ground when the source is moved from location to location.

3. The vibratory seismic source according to claim 1, further including a diesel engine to drive the generator.

4. The vibratory seismic source according to claim 1, further including a plurality of wheels on which the seismic source may transit from location to location and at least one electric motor to drive at least one wheel to power the seismic source to move from location to location.

5. The vibratory seismic source according to claim 1, further including an electric power accumulator for storing electric power that is comprised of rechargeable batteries.

6. The vibratory seismic source according to claim 1, further including an electric power accumulator for storing electric power that is comprised of a configuration of capacitors.

7. The vibratory seismic source according to claim 1, further including a electric power accumulator for storing electric power that is comprised of rechargeable batteries and a configuration of capacitors.

8. A process for delivering acoustic energy into the earth for seismic prospecting, the process comprising:
   a) creating electric power with a generator on a mobile seismic source;
   b) periodically storing with an electric power accumulator on the mobile seismic source excess electric power generated by the generator;
   c) providing about 100 to 5,000 linear electric motors carried in a frame, wherein each linear electric motor comprises a tubular body and a rod for telescopically extending down from the tubular body into contact with the ground;
   d) lowering the rods to the ground and utilizing electric power from both the generator and the battery directly from each to power the linear electric motors and drive the rods down against the ground in a series of impulses so that the ground is vibrated and deliver acoustic energy into the earth.

9. The process for delivering acoustic energy into the earth according to claim 8 further including the step of lowering each of the rods to the ground and maintaining the lower ends of the rods in continuous contact with the ground as the acoustic energy is delivered into the earth.

10. The process for delivering acoustic energy into the earth according to claim 8 wherein the rods are successively thrust against the ground and recoiled away from the ground without losing contact with the ground to deliver a series of impulses into the earth such that the timing for the impact, recoiling and successive impact progresses through a frequency spectrum to include a range of frequencies for acquiring reflections from the earth at geophones arrayed across a survey area.

11. The process for delivering acoustic energy into the earth according to claim 8 further including a step of using electric power on the mobile seismic source to move the seismic source to a selected location and after the acoustic energy has been delivered into the earth at that selected location, using electric power on the mobile seismic source to move the seismic source to another selected location.

* * * * *